US012573762B2

(12) United States Patent
Sano

(10) Patent No.: US 12,573,762 B2
(45) Date of Patent: Mar. 10, 2026

(54) ANTENNA APPARATUS AND ELECTRONIC TIMEPIECE

(71) Applicant: CASIO COMPUTER CO., LTD., Tokyo (JP)

(72) Inventor: Takashi Sano, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 230 days.

(21) Appl. No.: 18/189,454

(22) Filed: Mar. 24, 2023

(65) Prior Publication Data

US 2023/0307842 A1 Sep. 28, 2023

(30) Foreign Application Priority Data

Mar. 25, 2022 (JP) ................................. 2022-049880

(51) Int. Cl.
*H01Q 9/04* (2006.01)
*G04R 60/06* (2013.01)
*H01Q 1/27* (2006.01)
*H01Q 5/328* (2015.01)

(52) U.S. Cl.
CPC ........... *H01Q 9/0464* (2013.01); *G04R 60/06* (2013.01); *H01Q 5/328* (2015.01); *H01Q 1/273* (2013.01)

(58) Field of Classification Search
CPC ...... H01Q 9/0464; H01Q 5/328; H01Q 1/273; H01Q 5/30; G04R 60/06; G04R 60/02-12
See application file for complete search history.

(56) References Cited

U.S. PATENT DOCUMENTS

2014/0266920 A1* 9/2014 Tran ........................ H01Q 1/243
343/702
2017/0192396 A1* 7/2017 Matsuzaki ........... H04B 1/1607
2022/0379843 A1* 12/2022 Weijian ................... B60R 25/24

FOREIGN PATENT DOCUMENTS

JP 2019168336 A 10/2019

* cited by examiner

*Primary Examiner* — Hoang V Nguyen
*Assistant Examiner* — Anna N Hamadyk
(74) *Attorney, Agent, or Firm* — Scully, Scott, Murphy & Presser, P.C.

(57) ABSTRACT

An antenna apparatus includes, a ring-shaped antenna element positioned on a first plane; a grounding conductive plate positioned on a second plane parallel to the antenna element; a conductive member that is positioned on a side farther from a center position of the first plane enclosed by an outer periphery of the antenna element; and a power supply terminal. The power supply point is positioned in a predetermined nearby range from a boundary between a first region and a second region that include first and second angle ranges symmetrical with relation to the center position. The conductive member is positioned in at least one of the first region and the second region, and is provided in a position in which a spreading width from the center position in a distance direction are made different between the first region and the second region by the antenna element and the conductive member.

8 Claims, 6 Drawing Sheets

ANTENNA APPARATUS AND ELECTRONIC TIMEPIECE

REFERENCE TO RELATED APPLICATIONS

This application is based upon and claims the benefit of priority from the prior Japanese Patent Application No. 2022-049880, filed on Mar. 25, 2022, the entire contents of which are incorporated herein by reference.

TECHNICAL FIELD

The present invention relates to an antenna apparatus and an electronic timepiece.

DESCRIPTION OF RELATED ART

If a space between components in a small electronic device that receives radio waves is made smaller in order to make the electronic device smaller and lighter, it is known that this influences reception sensitivity of an antenna. JP 2019-168336 discloses a technique used in an electronic timepiece which is in a substantial circular shape in a plan view. An angle range in which a patch antenna is positioned is completely separated as an angle range different from a conductive member related to a solar cell and a motor related to driving pointers. With this, it is possible to reduce the influence from the other configurations applied to the reception of the radio waves received by the patch antenna.

SUMMARY OF THE INVENTION

According to one embodiment of the antenna apparatus of the present invention, the antenna apparatus includes: a ring-shaped antenna element positioned on a first plane; a grounding conductive plate positioned on a second plane parallel to the antenna element; a conductive member that is positioned on a side farther from a center position of the first plane enclosed by an outer periphery of the antenna element and that is electrically connected to the antenna element; and a power supply terminal connected to the antenna element at a power supply point, wherein the power supply point is positioned in a predetermined nearby range from a boundary between a first region that includes first angle ranges symmetrical with relation to the center position and a second region that includes second angle ranges that are different from the first region and that are symmetrical with relation to the center position, and wherein the conductive member is positioned in at least one of the first region and the second region, and the conductive member is provided in a position in which a spreading width from the center position in a distance direction are made different between the first region and the second region by the antenna element and the conductive member.

According to one embodiment of the antenna apparatus of the present invention, the antenna apparatus includes: a ring-shaped antenna element positioned on a first plane; a grounding conductive plate positioned on a second plane parallel to the antenna element; a conductive member that is not connected to the antenna element, wherein a range of a position of the conductive member in a height direction perpendicular to the first plane is between the antenna element and the conductive plate, and wherein the conductive member faces the antenna element and the conductive plate, and a power supply terminal connected to the antenna element at a power supply point, wherein the power supply point is positioned in a predetermined nearby range from a boundary between a first region that includes first angle ranges symmetrical with relation to a center position of the first plane enclosed by an outer periphery of the antenna element and a second region that includes second angle ranges that are symmetrical with relation to the center position and that are different from the first region, and wherein the conductive member is positioned in at least one of the first region and the second region to correspond to a first frequency and a second frequency with different reception targets, and the conductive member is provided in a position in which a characteristic regarding an electric capacitance between the antenna element and the conductive plate is different in the first region and the second region.

DETAILED DESCRIPTION

Hereinafter, embodiments of the present invention are described with reference to the drawings.

Figure 1A:
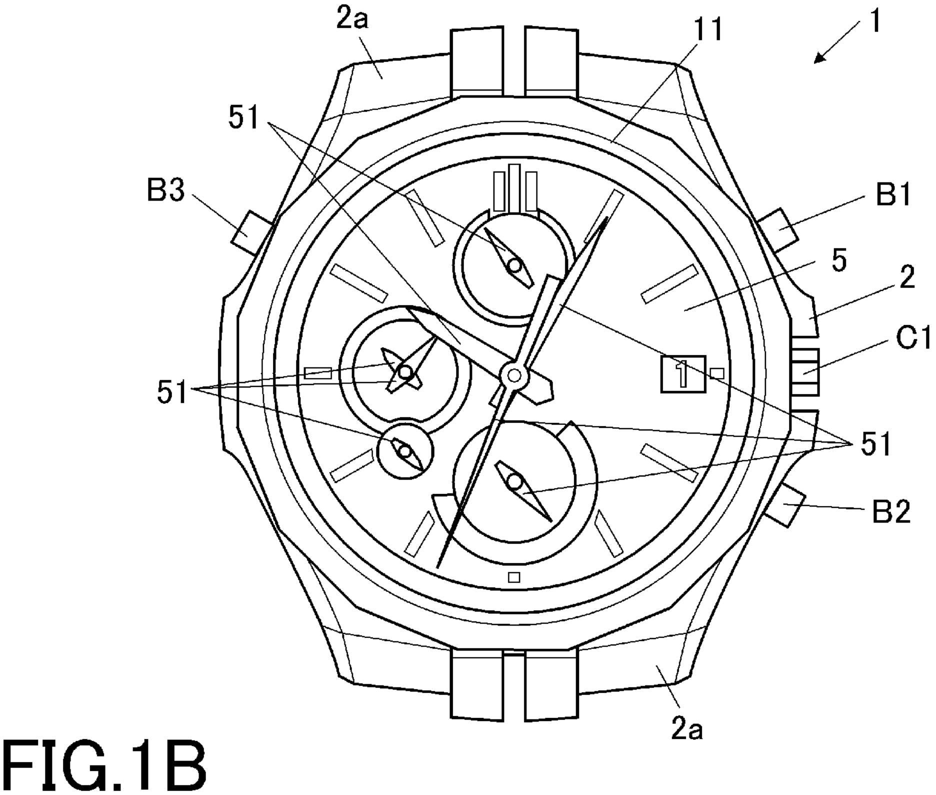
FIG. 1A is a plan view of an electronic timepiece.
Figure 1B:
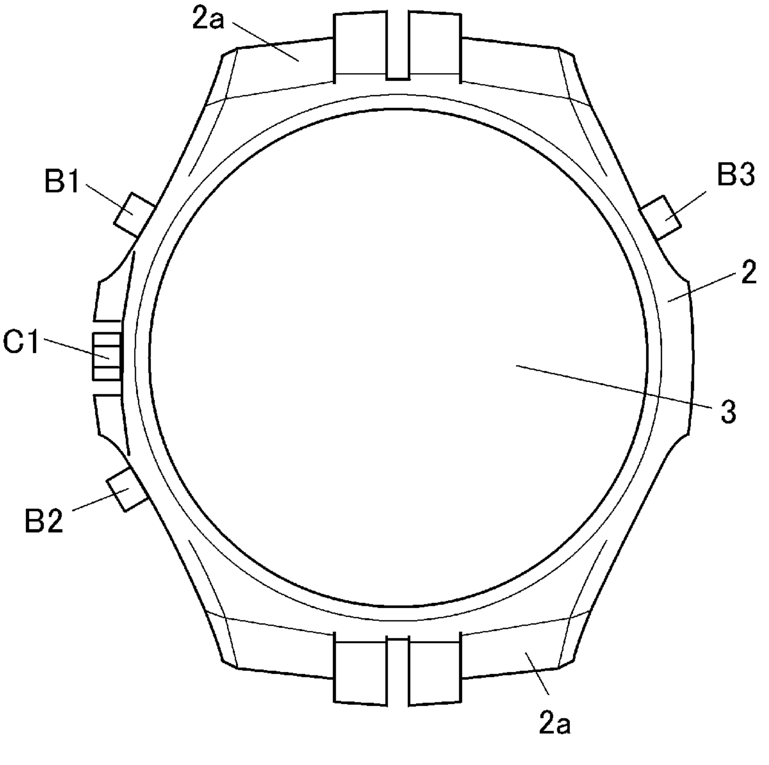
FIG. 1B is a bottom view of the electronic timepiece.

FIG. 1A is a plan view of an electronic timepiece 1 including an antenna apparatus of the present embodiment. FIG. 1B is a bottom view of the electronic timepiece 1.

As shown in the plan view of FIG. 1A, the electronic timepiece 1 includes a case 2, a display screen 5, and operation receivers that receive operation from outside such as press button switches B1 to B3, crown C1, etc. Pointers 51 are rotatably positioned on the display screen 5, and contents according to a direction pointed by the pointers 51 are displayed on the display screen 5. The contents displayed on the display screen 5 of the electronic timepiece 1 includes displaying the time (may be the date and time including the date and the day of the week).

The case 2 is in a cylindrical shape with the upper and lower surfaces open. In addition to the display screen 5, the case 2 stores inside a satellite radio wave receiver/processor (operator) that performs positioning calculation with a bezel 11 using the received radio waves, a controller that controls display contents displayed on the display screen 5, a driver regarding display by the display screen 5 (the driver and the display screen 5 are collectively referred to as a display) and a battery. The upper surface of the display screen 5 (upper edge of the case 2) is covered by a transparent windshield member (not shown). Areas near the tips of the press button switches B1 to B3 and the crown C1 penetrate through an opening of a lateral surface of the case 2 and are exposed outside. A belt attaching portion 2*a* extends from the display screen 5 toward the outer side in a 12 o'clock direction and a 6 o'clock direction of the case 2. According to the present embodiment, the case 2 is an insulating member (insulator, resin, ceramic, etc.).

The area above the display screen 5 surrounding the windshield member is surrounded by a bezel 11. Such bezel 11 may include indexes pointed by the pointer 51. In addition to decorative purposes, the bezel 11 also functions as an antenna element as described later.

As shown in the bottom view of FIG. 1B, the lower edge of the case 2 is sealed by a back lid 3 (conductive plate). The back lid 3 is a conductive member (for example, metallic members such as various types of stainless steel, titanium, and the like). The back lid 3 is a case grounding surface, and is grounded by coming into contact with an arm of the user wearing the timepiece (GND, earth connection).

Next, the antenna configuration according to the present embodiment is described.

The electronic timepiece 1 according to the present embodiment uses a single antenna and receives radio waves with a plurality of frequencies. For example, the electronic timepiece 1 receives radio waves in a L1 band (1.57542 GHZ; second frequency) regarding GPS (Global Positioning System) and radio waves in a L5 band (1.17645 GHz; first frequency) from positioning satellites. These frequencies, that is, the wavelengths are different by about 30%. Due to restrictions of design and actual use of the electronic timepiece 1 (watch), it is difficult to change the entire size (make larger) of the electronic timepiece 1 in order to match a reception wavelength of the antenna.

In the electronic timepiece 1, the ring shaped bezel 11 is divided into areas divided by two directions orthogonal to each other. That is, two opposite blocks among the four blocks formed every 90 degrees (for example, the center direction of each block is the 12 o'clock direction, the 3 o'clock direction, the 6 o'clock direction and the 9 o'clock direction) are to be the same area. By corresponding the electrical length in the direction along the line connecting the center of each area to each wavelength of 2 reception frequencies (for example, $\lambda/8$), it is possible to receive radio waves in a plurality of wavelengths. The radio waves transmitted from a GPS positioning satellite (GPS satellite) are circularly polarized to the right, but each reception is reception as linear polarized waves. The direction of each area needs to be different from the direction from the center position of the electronic timepiece 1 (bezel 11) to the connection point (power supply point) with a power supply terminal.

Figure 2A:
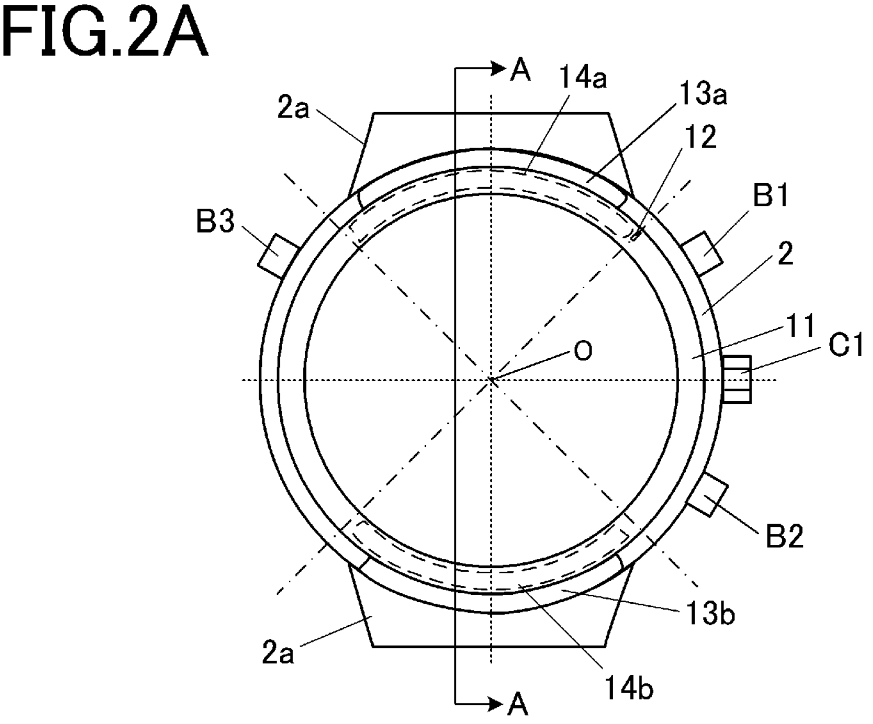
FIG. 2A is a plan view of the electronic timepiece in order to explain a first example of an antenna configuration.
Figure 2B:
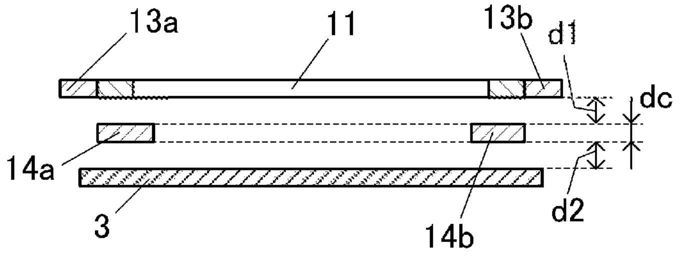
FIG. 2B is a cross-sectional view of the electronic timepiece in order to explain the first example of the antenna configuration.

FIG. 2A and FIG. 2B are diagrams describing a first example of the antenna configuration. In the diagrams that follow, the shape of the outline of the case 2 is shown in a simplified manner. The illustration and description of the configuration not necessary for receiving the radio waves is omitted.

As shown in the plan view of FIG. 2A, the antenna element viewed from above (in a plan view) is the ring-shaped bezel 11 positioned on the upper side of the case 2 in the plane (first plane) parallel to a plane (second plane) including the back lid 3. The antenna element may be a dedicated conductor member other than the bezel. A power supply point where the bezel 11 is connected to the power supply terminal 12 is positioned in a one-thirty direction of the bezel 11. The one-thirty direction is an average direction of a first diameter direction and a second diameter direction described later (on the plane, there are 2 average directions of the diameter direction (full width direction) not discriminating the start point and the end point, but either one may be selected). The bezel 11 operates as a microstrip antenna by a combination with a back lid 3 that composes a grounding surface (case grounding) positioned parallel.

The bezel 11 can be divided (not divided physically) into four blocks for every 90 degrees by a straight line (reference line) passing through a power supply terminal 12 and a center position O of the bezel 11 and a straight line that is orthogonal to the above line and that passes the center position O (the above 2 straight lines are shown with an alternate long and short dash line) in a plan view (below, plan view includes a case which cannot be actually seen when viewed from the above (that is, a see-through state or plan view see-through state is included)). The center of each block is in the direction showing 12 o'clock, 3 o'clock, 6 o'clock, and 9 o'clock (shown with dotted line). Here, the center position O of the bezel 11 shows the center position of a range on a first plane that is a plane including the bezel 11 enclosed by an outer periphery of the bezel 11.

Among the above, an area (second region) including two blocks which are a block in the 3 o'clock direction (90 degrees from one-thirty to four-thirty (second angle range)) and a block in the 9 o'clock direction (90 degrees from seven-thirty to ten-thirty) that is symmetrical with relation to the center position O to the block in the 3 o'clock direction receives the radio wave with a wavelength according to the diameter of the bezel 11 as the second frequency. The second frequency is on a high frequency side of the two reception target frequencies, that is, the radio wave in the L1 band.

In the area (first region) including two blocks which are a block in the 12 o'clock direction (90 degrees from ten-thirty to one-thirty (first angle range)) and a block in the 6 o'clock direction (90 degrees from four-thirty to seven-thirty) that is s symmetrical with relation to the center position O to the block in the 12 o'clock direction, each of a metallic member 13*a* and 13*b* come into contact with the outside of the bezel 11 (side far from the center position O) so as to be electrically connected. The metallic members 13*a* and 13*b* may be adhered and fixed to the bezel 11 by soldering or may be pressed and fixed by another member from outside without adhering. In the above first region, the metallic members 14*a* and 14*b* are positioned separated from the bezel 11 on a lower side of a position overlapping with the bezel 11 from a plan view.

The metallic members 13*a*, 13*b*, 14*a*, and 14*b* positioned around the bezel 11 are adjusting members to adjust the frequency (reception frequency) of the radio wave that is the target of reception by the bezel 11. For example, the metallic members 13*a*, 13*b*, 14*a*, and 14*b* are stainless steel. The metallic members such as grounding film on the substrate as described later may be copper, silver, etc. and those that are exposed to the outer surface may be titanium, etc. The above does not have to be a single type and a plurality of types of materials may be mixed. One or all of the metallic members 13*a*, 13*b*, 14*a*, and 14*b* may be the same material as the back lid 3 or may be a different material.

Because of the metallic members 13*a* and 13*b* in contact with the bezel 11, the width of the radio wave reception surface from the center position O toward the distance direction (spreading width) becomes large. Therefore, compared to the radio wave reception in the second diameter direction (second full width direction) that crosses the bezel 11 including the 3 o'clock direction, the center position O, and the 9 o'clock direction, that is, in the second region, the radio wave reception in the first diameter direction (first full width direction) that crosses the bezel 11 including the 12 o'clock direction, the center position O of the bezel 11, and the 6 o'clock direction, that is, in the first region, the wave length of the received radio wave becomes long and the excited frequency decreases. The metallic members 13*a* and 13*b* may extend to above the belt attaching portion 2*a*. However, as described above, it is difficult to make the metallic members 13*a* and 13*b* significantly larger.

FIG. 2B shows a cross-sectional view showing only the related configuration along the cross-sectional line AA in FIG. 2A. The metallic members 14*a* and 14*b* are a thickness dc and are positioned between the bezel 11 and the back lid 3. With this, the distance (d1+dc+d2) between the back lid 3 as the grounding surface and the bezel 11 decreases in the amount of the thickness dc of the metallic members 14*a* and 14*b*. Since the electric capacitance between the back lid 3 and the bezel 11 depends on the above distance, the electric capacitance increases. If the metallic members 14*a* and 14*b* are grounded to the case (same potential as the back lid 3), the above distance substantially becomes only the distance d1 between the metallic members 14*a* and 14*b* and the bezel 11. Therefore, the electric capacitance increases even more. With this, the appearance of the electrical length on the bezel 11 is extended. Therefore, even if the size is the same, low frequency radio waves with a longer wave length are excited. In a situation that the radio waves with a high frequency (here, including receiving the GHz band) are received (transmitted), the influence of the above-described characteristics regarding the electric capacitance of each polarized wave direction becomes larger than the influence of the entire static electric capacitance of the bezel 11. Therefore, by suitably aligning the metallic members 14*a*, 14*b*, 13*a*, and 13*b*, the frequencies of the radio waves excited in the direction along each cross section are suitably adjusted, and the radio wave on the low frequency side of the 2 received frequencies, that is, here, the L5 band can be received.

Figure 3A:
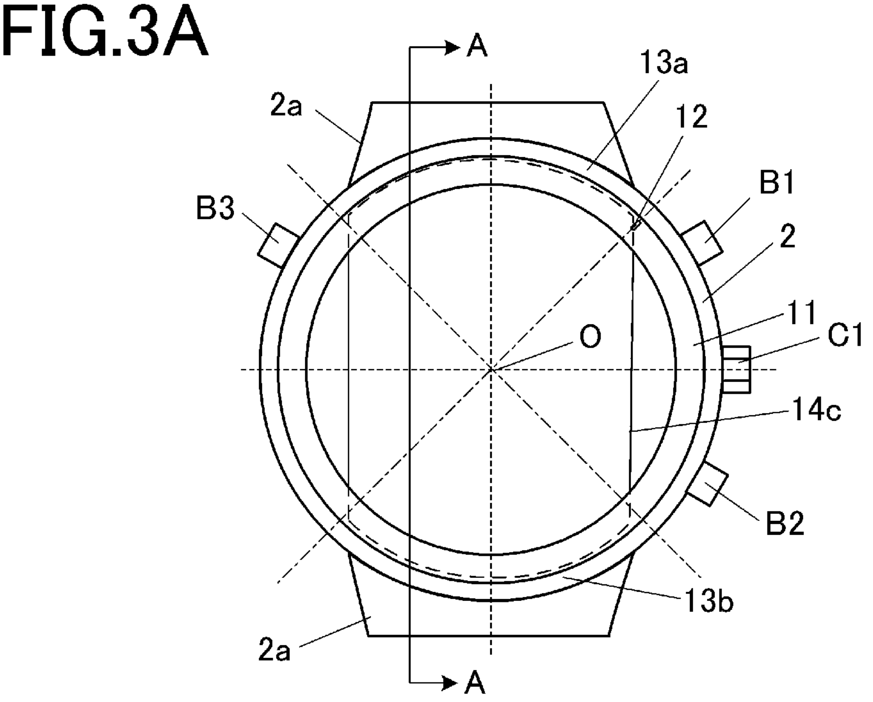
FIG. 3A is a plan view of the electronic timepiece in order to explain a second example of the antenna configuration.
Figure 3B:
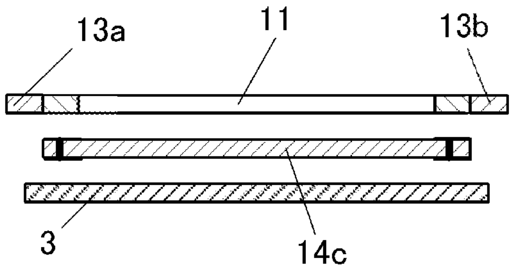
FIG. 3B is a cross-sectional view of the electronic timepiece in order to explain the second example of the antenna configuration.

FIG. 3A and FIG. 3B are diagrams describing a second example of the antenna configuration.

The metallic members do not have to be positioned so that there is one in each of the 12 o'clock direction and the 6 o'clock direction. As shown in the plan view in FIG. 3A, for example, the circuit substrate 14*c* positioned in the case 2 may extend up to between the bezel 11 and the back lid 2 in the 12 o'clock direction and the 6 o'clock direction. As shown in the cross-sectional view in FIG. 3B (cross-sectional line AA in FIG. 3A), the extending portion of the circuit substrate 14*c* includes a conductor surface (metallic member) on both surfaces, and the conductor surfaces are electrically connected to each other. With this, the conductor surface includes a function the same as the metallic members 14*a* and 14*b*. The conductor surface may be a normal grounding surface of the circuit substrate 14*c*. Although not limited, a through hole can be used in the electric connection. The metallic members 14*a* and 14*b* can be positioned between the circuit substrate 14*c* and the bezel 11 as necessary.

Figure 4A:
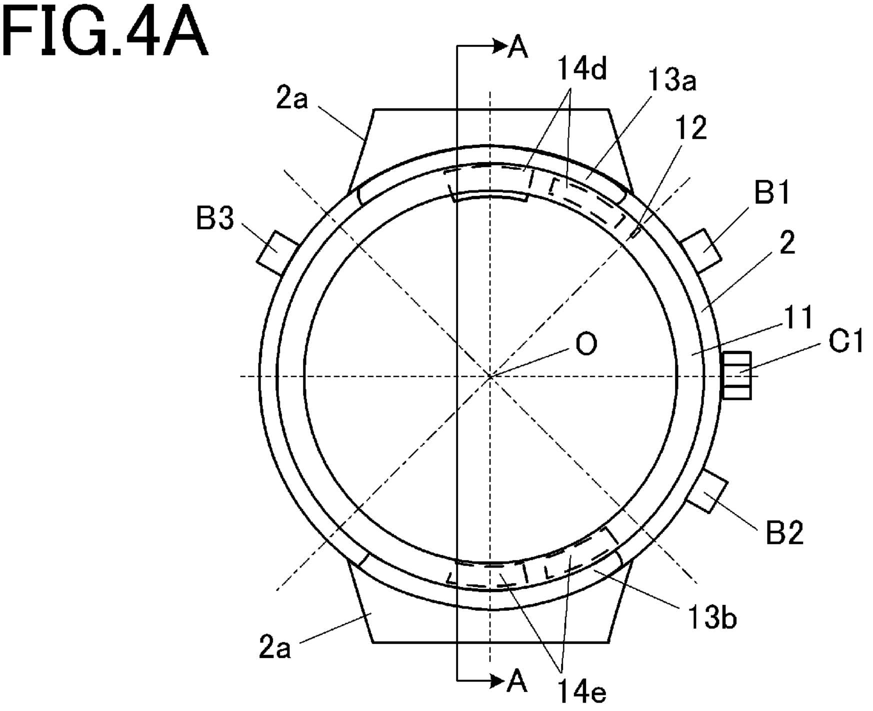
FIG. 4A is a plan view of the electronic timepiece in order to explain a third example of the antenna configuration.
Figure 4B:
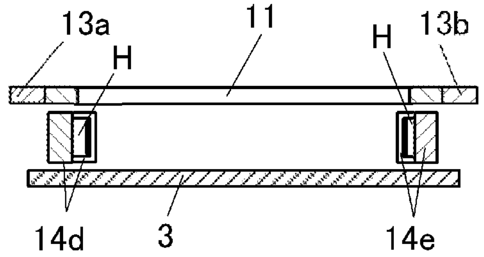
FIG. 4B is a cross-sectional view of the electronic timepiece in order to explain the third example of the antenna configuration.

FIG. 4A and FIG. 4B are diagrams describing a third example of the antenna configuration.

As shown in the plan view in FIG. 4A, the metallic members 14*d* and 14*e* are divided (separated from each other) in portions including a plurality of members each (for example, 2). Many other components are stored inside the case 2. Therefore, the metallic members 14*d* and 14*e* may be positioned in a divided state in some ranges in which the members can be positioned with relation to the positions of the other components. The shape of the plurality of metallic members 14*d* and 14*e* in this case may be different from each other.

The above metallic members 14*d* and 14*e* may be hollow or frame-shaped. As shown in the cross-sectional view in FIG. 4B (cross-sectional line AA in FIG. 4A), for example, the metallic members 14*d* and 14*e* are a frame shape in which a direction that penetrates a through hole H perpendicularly is parallel to the first plane including the bezel 11. The upper side and the lower side of the frame are electrically connected. The metallic members 14*d* and 14*e* do not include an opening on the surfaces facing the bezel 11 and the back lid 3. That is, since the square area of the region where the metallic members 14*d* and 14*e* face the bezel 11 and the back lid 3 does not become small, an electric capacitance that is larger compared to the volume can be obtained by the sum of the distance between the upper side and the bezel 11 and the distance between the lower side and the back lid 3.

Figure 5:
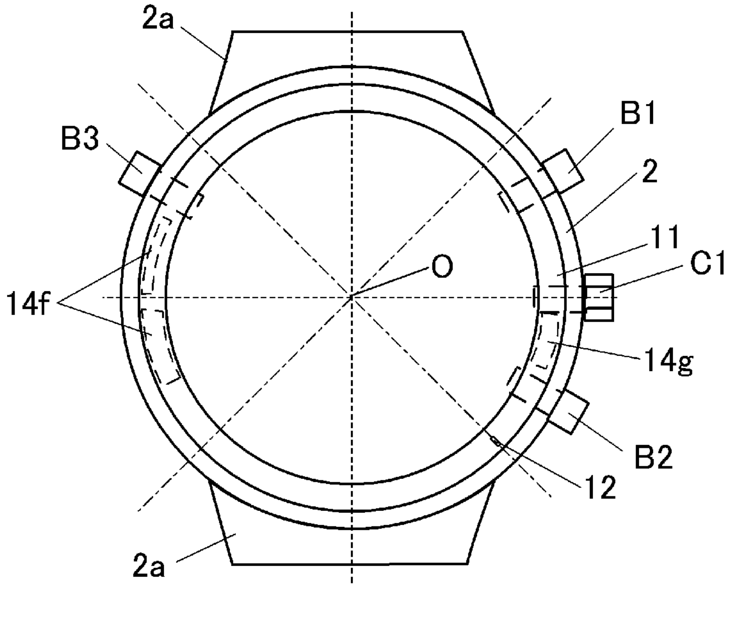
FIG. 5 is a plan view of the electronic timepiece in order to explain a fourth example of the antenna configuration.

FIG. 5 is a diagram describing a fourth example of the antenna configuration.

Conventional components such as press button switches B1 to B3 or the crown C1 may be included in the metallic member positioned between the bezel 11 and the back lid 3. Here, the power supply terminal 12 is positioned in the four-thirty direction. The press button switches B1 to B3, the crown C1, and the metallic members 14*f* and 14*g* are positioned in the range (first region) 90 degrees counter clockwise from the reference line corresponding to the position of the power supply terminal 12. The press button switches B1 to B3 and the crown C1 may be grounded to the case using the spring as a countermeasure against static electricity. However, a mechanism in which the grounding state can be stably maintained or on the other hand, a structure in which grounding to the case is usually not performed is employed so that the excited frequency and the reception gain do not change due to the state of grounding to the case changing during the reception by pressing the press button switches B1 to B3 and rotating the crown C1.

The positions of the press button switches B1 to B3 and the crown C1 are determined based on user convenience, and it is difficult to shift the positions drastically. However, it is possible to make slight adjustments such as changing the thickness of the axis (thicker) depending on the frequency of the reception target. As in the example above, the position of the power supply point may be determined considering the position of the press button switches B1 to B3 and the crown C1.

According to the above, it is described that the radio waves on the high frequency side (second frequency) are received in the range 90 degrees in the clockwise direction with respect to the reference line in a plan view and the radio waves on the low frequency side (first frequency) are received in the range 90 degrees in the counter-clockwise direction with respect to the reference line in a plan view (same positional relationship as normal reception of a right-hand circular polarized wave). However, as described above, in the electronic timepiece 1 according to the present embodiment, the radio waves are received as linear polarized waves even if the radio waves which are the target of reception are circular polarized waves. Therefore, it is not necessarily relevant which side the reception area of the low frequency side and the reception area of the high frequency are positioned with respect to the position (angle direction) of the power supply terminal 12. That is, the relation of the positions of the first region and the second region with respect to the reference line may be opposite from the position as described in the above description of the embodiment. The apparatus is to be configured to be able to suitably receive radio waves on the high frequency side and the radio waves on the low frequency side in a direction about ±45 degrees the reference line. The position ±45 degrees from the reference line is not selectively detected. Therefore, the configuration is to be adjusted so that the gain of the radio wave of the second frequency on the high frequency side and the gain of the radio wave of the first frequency on the low frequency side is obtained in the range of about ±90 degrees from the reference line as a whole.

The direction in which the most gain can be actually obtained in the desired excited frequency is influenced by the large number of components positioned inside the case 2 (for example, wiring on the wiring substrate, grounding surface, cable, screw, small screw, coil spring, leaf spring, electronic component, supporting frame to which the substrate is fixed (frame), and the like). Therefore, it is difficult to theoretically determine the size and the position of the metallic members. The optimal size and position may be determined based on results of tests and experiments using numerical value analysis (simulation) as necessary.

Figure 6A:
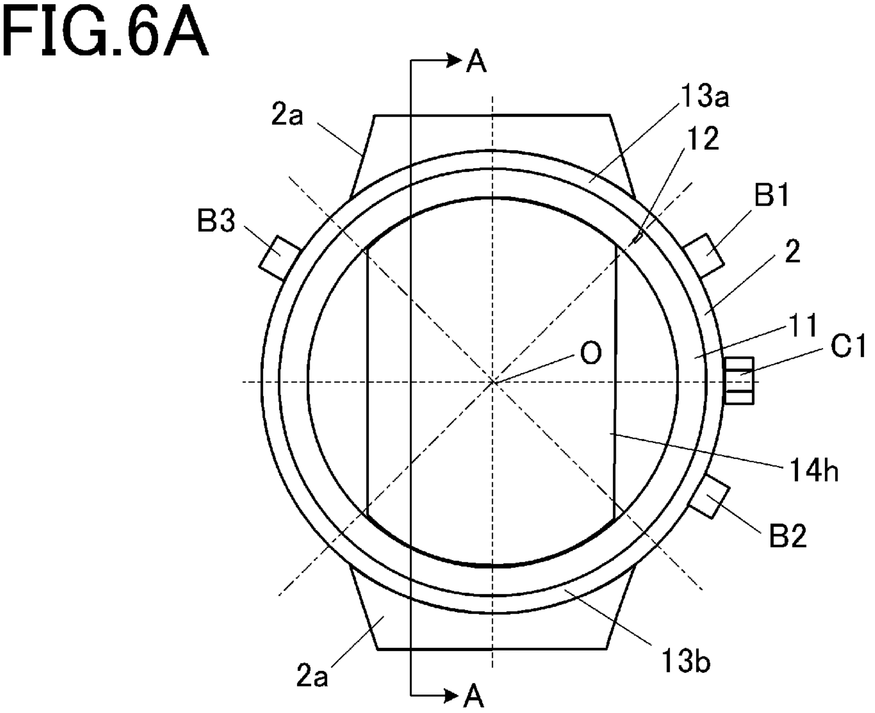
FIG. 6A is a plan view of the electronic timepiece in order to explain a fifth example of the antenna configuration.
Figure 6B:
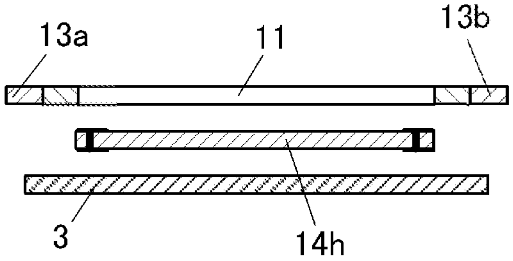
FIG. 6B is a cross-sectional view of the electronic timepiece in order to explain the fifth example of the antenna configuration.

FIG. 6A and FIG. 6B are diagrams describing a fifth example of the antenna configuration.

As shown in the plan view of FIG. 6A and FIG. 6B showing the cross-sectional view of the cross-sectional line AA in FIG. 6A, the metallic members do not always have to be in a position overlapped with the bezel 11 in a plan view. Here, the outer edge of the circuit substrate 14*h* is substantially in the same position as the inner edge of the bezel 11 in a plan view in the 12 o'clock and 6 o'clock direction, and the edges do not overlap in the plan view. Even if the relation of the position is merely to come into contact in a plan view (or merely to partially overlap) (although meaning is lost if the positions are far apart), the conductor of the circuit substrate 14*h* may contribute to the increase in the capacity. In a situation that the bezel 11 is positioned on the case 2, by providing anisotropy in the range of the shape and the grounding surface of the circuit substrate 14*h* positioned inside (along the inner wall surface) of the case 2, the excited frequencies can be distributed multiply, and the radio waves in a plurality of frequencies can be received.

As described above, the electronic timepiece 1 including the antenna apparatus according to the present embodiment includes the following. The ring-shaped bezel 11 is positioned on a first plane. The back lid 3 for grounding (may be case grounding) is positioned on a second plane parallel to the bezel 11. The metallic members 13*a* and 13*b* electrically connected to the bezel 11 are positioned on a side farther than the center position O on the first plane surrounded by an external periphery of the bezel 11. The power supply terminal 12 connects to the bezel 11 at the power supply point. The power supply point is positioned in a range near a first region (for example, 12 o'clock direction, 6 o'clock direction) including first angle ranges that are symmetrical with relation to the center position O and a second region (for example, 3 o'clock direction, 9 o'clock direction) including second angle ranges that are symmetrical with relation to the center position O and that are different from the first region. The metallic members 13*a* and 13*b* are positioned in at least one of the first region and the second region. Widths of expansion in a distance direction from the center position O are set to be different in the first region and the second region by the bezel 11 and the metallic members 13*a* and 13*b*.

Lately, electronic devices that receive radio waves in a plurality of frequencies are increasing. In a situation that the plurality of frequencies are separated to the extent that the reception band of the plurality of frequencies cannot be covered by an antenna with a single excited frequency, if the plurality of antennas are simply positioned to maintain reception sensitivity of all antennas, the antennas consume space. Consequently, this may be an obstacle in reduction of the weight and size.

According to the antenna apparatus of the present embodiment, the metallic members are suitably positioned around the bezel 11 with the bezel 11 itself which is a single antenna element maintaining the shape corresponding to the single reception frequency. With this, since the excited frequency regarding the reception of the linear polarized wave partially decreases, depending on the direction, the antenna element can be excited in frequencies near the two frequencies which are the targets of reception. Therefore, in addition to receiving the radio waves at the excited frequency according to the bezel 11 of the original size, the antenna element is also able to easily receive the radio wave with a frequency lower than the above. Moreover, the shape and the position of the metallic members 13*a* and 13*b* can be flexibly determined compared to making the bezel 11 in a complicated shape.

The electronic timepiece 1 including the antenna apparatus according to another embodiment includes the following. The above-described bezel 11, back lid 3, and the power supply terminal 12 are included. In addition to the above, the electronic timepiece 1 includes metallic members 14*a* and 14*b*. The metallic members 14*a* and 14*b* are conductive members which are not electrically connected to the bezel 11, which are positioned so that the range in the height direction perpendicular to the first plane is between the bezel 11 and the back lid 3, and which face the bezel 11 and the back lid 3. The metallic members 14*a* and 14*b* each correspond to the first frequency and the second frequency in which the target of reception is different. The metallic members 14*a* and 14*b* are positioned in at least one of the first region and second region. The above metallic members 14*a* and 14*b* are positioned so that the characteristic regarding the electric capacitance between the bezel 11 and the back lid 3 is different in the first region and the second region. "Facing" here is not limited to when the facing surfaces are opposed to each other parallel, and also includes when one surface is tilted with relation to the other surface. As described above, the metallic members 14*a* and 14*b* substantially shorten the distance between the bezel 11 of the micro-strip antenna and the grounding surface, and it is possible to increase the electric capacitance. Therefore, the antenna apparatus is able to reduce the excited frequency limited to some directions, and is able to efficiently receive the original excited frequency and both frequencies with one antenna element and one power supplying terminal.

The metallic members 14*a* and 14*b* are overlapped with the bezel 11 at least partially in a plan view (including seeing through outside components and viewing components which cannot be actually seen). With this, the metallic members 14*a* and 14*b* are able to effectively increase the electric capacitance between the bezel 11 and the back lid 3.

A plurality of metallic members can be aligned as in the metallic members 14*d* and 14*e*. Many components are positioned in the case 2 compared to the size of the electronic timepiece 1, and there may not be space to insert large and uniformly sized metallic members 14*a* and 14*b*. By combining and inserting smaller metallic members 14*d* and 14*e* in a range in which a plurality of members can be inserted suitably, the antenna apparatus is able to receive radio waves with an excited frequency lower than the original excited frequency of the bezel 11 effectively and without effort.

The conductive member (metallic member) may be a conductor surface (grounding surface) positioned on both surfaces of the substrate to be electrically connected as in the circuit substrate 14*c*. By slightly changing the shape of the circuit substrate in an extent possible, the conductor surface can be easily fixed to the predetermined position of the antenna apparatus.

Since the first diameter direction (12 o'clock, 6 o'clock direction) and the second diameter direction (3 o'clock, 9 o'clock direction) are perpendicular to each other, the reception portion of the radio waves in the plurality of frequencies by the bezel 11 (antenna element) can be greatly separated. Therefore, the metallic members 13*a* and 13*b* and the metallic members 14*a* and 14*b* can be easily and suitably positioned in the antenna apparatus.

The power supply point is positioned in an average direction of the first diameter direction and the second diameter direction (one-thirty direction on the reference line). As described above, since the power supply terminal 12 is connected in a position separated evenly from both directions, the antenna apparatus is able to enhance the gain of the radio waves with a plurality of wavelengths in a well-balanced manner.

The electronic timepiece 1 includes the case 2 that stores inside the satellite radio wave receiver/processor as an operator that performs at least one of reception and transmission (here, reception) of the radio waves using the bezel 11. The conductive plate may be the back lid 3 of the case 2. Even when it is difficult to prepare a dedicated grounding surface, by using such lid as the grounding surface, the electronic timepiece 1 is able to receive the radio wave with less space. Especially in an electronic timepiece 1 in a watch shape, the back lid 3 easily comes into contact with the human body. Therefore, the conductive plate is suitably grounded.

The electronic timepiece 1 according to the present embodiment includes the above-described antenna apparatus and the display and the controller positioned in the case 2. The controller controls the display to display the time.

According to the electronic timepiece 1 (specifically, watch), radio waves in a plurality of frequencies can be received with the antenna element maintained as one bezel 11. Therefore, it is possible to save space and to use the received (communicated) radio wave more efficiently.

The conductive member (metallic member) may include the press button switches B1 to B3 and the crown C1 which are operation receivers that receive operation from outside. By also suitably using the metallic components that originally exist, it is possible to receive (transmit) the radio wave in a plurality of frequencies while suppressing the increase of the size.

The first region includes the 12 o'clock direction and the 6 o'clock direction and the second region includes the 3 o'clock direction and the 9 o'clock direction. Since the belt is attached to the electronic timepiece 1 in a watch shape in the 12 o'clock, 6 o'clock direction, the main body such as the case 2 can be made slightly larger (longer) easily in this direction. Therefore, by positioning the metallic members 13*a* and 13*b* in this direction, the influence on the design of the electronic timepiece 1 can be suppressed to a minimum.

The present invention is not limited to the above embodiments, and various modifications are possible.

For example, according to the above embodiment, the metallic member is placed selectively in only the area where the frequency on the low side is received. However, as shown in FIG. 2 of the first example, the metallic member such as the operation receiver may exist in the area where the frequency on the high side is received. In this case, the diameter of the bezel 11 (antenna element) can be made smaller as a whole. However, in the area where the radio wave with the frequency on the low side is received, it is necessary to further decrease the excited frequency with more metallic members.

The ring-shaped antenna which is the bezel 11 is described as being circular, but the shape may include corners (rectangle, polygon, or shape with round corners) or may be an elliptical shape in a plan view according to the shape of the case 2.

According to the above embodiment, the first diameter direction (12 o'clock 6 o'clock direction) is perpendicular to the second diameter direction (3 o'clock 9 o'clock direction), and the power supply point is positioned in the average direction (one-thirty direction), but the configuration is not limited to the above. The two radio waves which are the target of reception are independent, and therefore, the waves do not have to be excited in the perpendicular direction. Therefore, if the angle from the reference line regarding the power supply point and the angle between the two directions can be obtained, the first diameter direction and the second diameter direction may be slightly shifted (for example, 10 degrees or less) from the perpendicular direction. The position of the power supply point may be shifted in the range slightly (predetermined nearby range), for example, not more than 5 degrees, depending on the situation not more than 15 degrees, from the average (intermediate) direction (boundary between first region and second region) of the first diameter direction and the second diameter direction as long as the angle formed by the reference line and the first diameter direction and the angle formed by the reference line and the second angle direction do not become small.

According to the third example of the above embodiment, the metallic members 14*d* and 14*e* that are hollow or in a frame shape are shown. However, other configurations (direction of the through hole of the frame may be tilted or in a up-down direction) can be employed as long as a suitable square area where the bezel 11 and the back lid 3 face each other is obtained, and the opposing surfaces are electrically connected. The opposing surfaces do not have to be the same position in a plan view.

According to the above embodiment, there is no metallic member between the bezel 11 and the back lid 3, but the configuration is not limited to the above. For example, in a situation that the inner wall surface of the case 2 is an uneven surface, and a metallic member is fit in the concave portion, the case 2 as the insulating member is inserted between the metallic member and the bezel 11 and the metallic member and the back lid 3. Alternatively, other insulating members may be positioned between the metallic member and the bezel 11 and between the metallic member and the back lid 3.

According to the above embodiment, examples of the metallic member separated from the bezel 11 in the case 2 include a dedicated member, the grounding surface on the substrate, and the operation receiver. In addition to or instead of the above, the metallic member may be other metallic members such as a screw, spring, or a frame. Such other metallic members may be intentionally positioned so that the relation of the positions are as described above.

If the excited frequency corresponding to the two types of reception frequencies can be obtained with only one among the metallic members 13*a* and 13*b*, and the metallic members 14*a* and 14*b*, the electronic timepiece 1 may include only one of the above.

According to the above embodiment, the back lid 3 is shown as the example of the conductive plate, but the configuration is not limited to the above. For example, the grounding surface of the circuit substrate including the satellite radio wave receiver/processor, the controller, and the driver may be the conductive plate, and the metallic member may be positioned between such circuit substrate and the bezel 11 in the grounding state or in the floating state.

According to the above embodiment, the radio waves are received from a positioning satellite, but the antenna may be an antenna used for reception and transmission of other radio waves.

The display screen 5 may be a digital display screen using a liquid crystal display instead of a display screen using pointers.

According to the above embodiment, the electronic timepiece 1 in a watch shape is described as an example, but the configuration is not limited to the above. Other electronic devices which do not include a time display function, or in which displaying the time is not the main function may be employed, examples including a wearable terminal such as an activity meter.

Other specific configurations, contents and procedures of the processing apparatus, and the like as described in the above embodiments may be suitably changed without leaving the scope of the invention.

Although some embodiments of the present invention have been described above, the scope of the present disclosure is not limited to the embodiments described above, but includes the scope of the invention described in the claims and their equivalents.

The invention claimed is:

1. An antenna apparatus comprising: a ring-shaped antenna element positioned on a first plane; a grounding conductive plate positioned on a second plane parallel to the ring-shaped antenna element; a conductive member that is positioned on a side farther from a center position of the first plane in which the ring-shaped antenna element is positioned and that is electrically connected to the ring-shaped antenna element; and a power supply terminal connected to the ring-shaped antenna element at a power supply point, wherein the power supply point is positioned in a predetermined nearby range from a boundary between a first region that includes first angle ranges symmetrical with relation to the center position and a second region that includes second angle ranges that are different from the first region and that are symmetrical with relation to the center position, wherein the conductive member is positioned in at least one of the first region and the second region, and the conductive member is provided in a position in which a spreading width from the center position in a distance direction are made different between the first region and the second region by the ring-shaped antenna element and the conductive member, and wherein the conductive member is positioned on the first plane, and is positioned parallel to the ring-shaped antenna element in a position that does not overlap with the ring-shaped antenna element in a plan view.

2. The antenna apparatus according to claim 1, wherein a first full width direction that connects centers of the first angle ranges of the first region is orthogonal to a second full width direction that connects centers of the second angle ranges of the second region.

3. The antenna apparatus according to claim 1, wherein the power supply point is positioned in an average direction of a first full width direction that connects centers of the first angle ranges of the first region and a second full width direction that connects centers of the second angle ranges of the second region.

4. The antenna apparatus according to claim 1, further comprising a case that stores inside an operator that performs at least one of transmission and reception of a radio wave using the ring-shaped antenna element, wherein the grounding conductive plate is a back lid of the case.

5. An electronic timepiece comprising:

an antenna apparatus according to claim 4; and a display and a controller positioned in the case, wherein the controller displays the time on the display.

6. The electronic timepiece according to claim 5, wherein the first region includes a 12 o'clock direction and a 6 o'clock direction, and the second region includes a 3 o'clock direction and a 9 o'clock direction.

7. The antenna apparatus according to claim 1, wherein the conductive member is arranged so that one conductive member is provided for each of a plurality of positions that are on an outer side of the ring-shaped antenna element in the plan view and that are symmetrical with relation to the center position.

8. The antenna apparatus according to claim 1, wherein the conductive member is provided in the first region and the ring-shaped antenna element and the conductive member are in an arc shape in the first region.

* * * * *